United States Patent
Yao et al.

(10) Patent No.: US 9,142,132 B2
(45) Date of Patent: Sep. 22, 2015

(54) COLLISION AVOIDANCE SYSTEM AND METHOD FOR VEHICLES

(71) Applicant: Automotive Research & Testing Center, Lugong (Changhua County) (TW)

(72) Inventors: Chi-Chun Yao, Lugong (TW); Jiun-Jie Chen, Lugong (TW); Shih-Chieh Huang, Lugong (TW); Ming-Hung Li, Lugong (TW)

(73) Assignee: Automotive Research & Testing Center, Lugong (TW)

( * ) Notice: Subject to any disclaimer, the term of this patent is extended or adjusted under 35 U.S.C. 154(b) by 0 days.

(21) Appl. No.: 14/141,098

(22) Filed: Dec. 26, 2013

(65) Prior Publication Data

US 2015/0187217 A1  Jul. 2, 2015

(51) Int. Cl.
*G06F 17/10* (2006.01)
*G01S 13/00* (2006.01)
*G08G 1/16* (2006.01)
*B60T 7/22* (2006.01)

(52) U.S. Cl.
CPC . *G08G 1/167* (2013.01); *B60T 7/22* (2013.01); *B60T 2201/022* (2013.01)

(58) Field of Classification Search
CPC .............. G08G 1/16; B60T 8/60; G06F 17/00; G06F 7/00; G01S 13/93; G06G 7/70; B60K 41/20; B60K 31/00; B60R 21/00; G05D 1/00; G06N 5/02
USPC ................ 701/301, 300, 96, 1, 52, 8; 342/70; 348/148; 340/903, 436; 303/175
See application file for complete search history.

(56) References Cited

U.S. PATENT DOCUMENTS

| | | | |
|---|---|---|---|
| 6,702,405 B1 | 3/2004 | Balz | |
| 2004/0090320 A1* | 5/2004 | Suzuki et al. | 340/435 |
| 2007/0192030 A1* | 8/2007 | Tanimichi et al. | 701/301 |

FOREIGN PATENT DOCUMENTS

KR  2005100988  * 4/2004

* cited by examiner

*Primary Examiner* — Muhammad Shafi
(74) *Attorney, Agent, or Firm* — Abelman, Frayne & Schwab (57) ABSTRACT

A collision avoidance system is configured to be installed in a vehicle, and includes a speed sensing unit to sense a speed of the vehicle, a distance sensing unit to sense a distance between the vehicle and a nearby object, an EPB unit to decelerate the vehicle, and a control unit to compute a length of collision time after which the vehicle is predicted to collide with the object according to the speed of the vehicle and the distance between the vehicle and the object, and to control the EPB unit to decelerate the vehicle when the collision time is not longer than a brake time length.

18 Claims, 6 Drawing Sheets

COLLISION AVOIDANCE SYSTEM AND METHOD FOR VEHICLES

BACKGROUND OF THE INVENTION

1. Field of the Invention

The invention relates to a collision avoidance system and method for vehicles.

2. Description of the Related Art

During driving, especially when parking or driving in reverse gear, since it is difficult for a driver to pay attention to all directions due to limited driver's field of view, collision accidents may happen. How to avoid vehicle collisions is always a goal in the industry.

Conventional vehicle collision avoidance techniques are passive safety warning techniques that generate warning to attract the driver's attention when the vehicle is close to an object. Recently, active brake assist techniques have been developed. The active brake assist techniques usually employ a hydraulic brake control system or an electronic stability program (ESP) cooperating with a distance sensor, resulting in higher costs and complicated control.

SUMMARY OF THE INVENTION

Therefore, an object of the present invention is to provide a collision avoidance system that may overcome the above drawbacks of the prior art.

According to one aspect of the present invention, a collision avoidance system is configured to be installed in a vehicle, and comprises:

a speed sensing unit configured to sense a speed of the vehicle, and to generate a vehicle speed signal corresponding to the speed sensed thereby;

a distance sensing unit configured to sense a distance between the vehicle and an object located in a vicinity of the vehicle, and to generate a distance indicating signal corresponding to the distance sensed thereby;

an electronic parking brake (EPB) unit disposed to receive a control signal, and configured to decelerate the vehicle according to the control signal; and a control unit coupled to the speed sensing unit and the distance sensing unit for respectively receiving the vehicle speed signal and the distance indicating signal therefrom, and further coupled to the EPB unit, the control unit being configured to compute a length of collision time after which the vehicle is predicted to collide with the object according to the vehicle speed signal and the distance indicating signal, and to output the control signal when the collision time is not longer than a brake time length.

Another object of the present invention is to provide a collision avoidance method.

According to another aspect of the present invention, a method is provided for avoiding collision of a vehicle with an object. The method is to be implemented by a collision avoidance system installed in the vehicle, and comprises:

(A) sensing, by the collision avoidance system, a speed of the vehicle and a distance between the vehicle and an object located in a vicinity of the vehicle;

(B) computing, by the collision avoidance system, a length of collision time after which the vehicle is predicted to collide with the object according to the speed and the distance sensed in step (A); and (C) decelerating, by the collision avoidance system, the vehicle when the collision time computed in step (B) is not longer than a brake time length.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
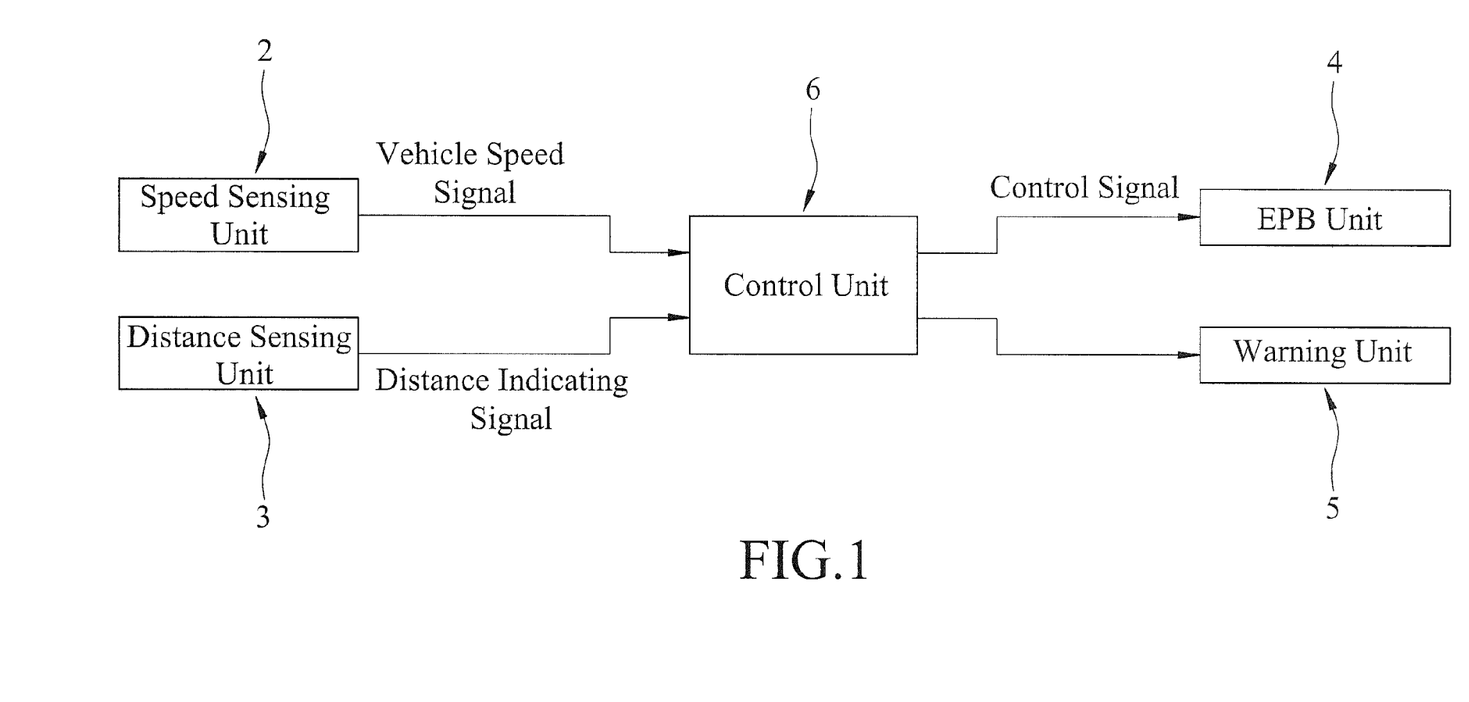
FIG. 1 is a block diagram illustrating a preferred embodiment of a collision avoidance system according to the present invention.
Figure 2:
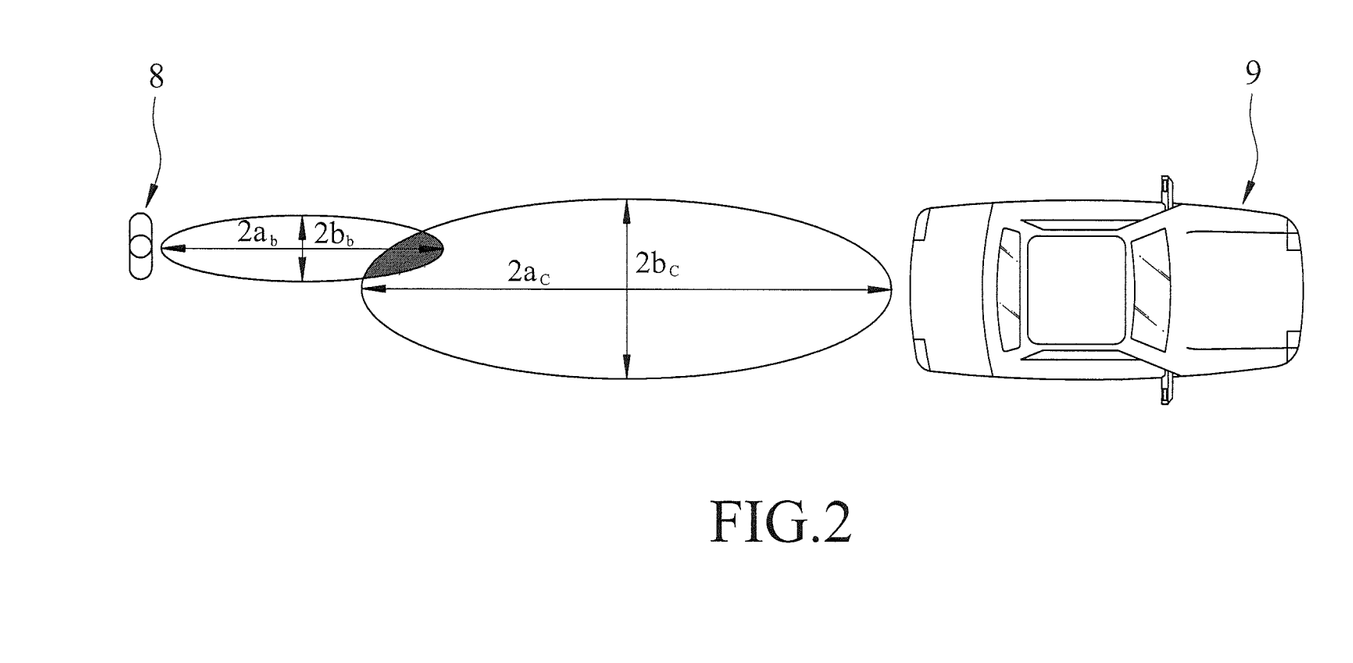
FIG. 2 is a schematic diagram illustrating a vehicle movement area and an object movement area predicted by the preferred embodiment.

Referring to FIGS. 1 and 2, the preferred embodiment of the collision avoidance system according to this invention is configured to be installed in a vehicle 9, and includes a speed sensing unit 2, a distance sensing unit 3, an electronic parking brake (EPB) unit 4, a warning unit 5, and a control unit 6.

The speed sensing unit 2 senses a speed of the vehicle 9, and generates a vehicle speed signal corresponding to the speed sensed thereby.

The distance sensing unit 3 senses a distance between the vehicle 9 and an object 8 located in a vicinity of the vehicle 9, and generates a distance indicating signal corresponding to the distance sensed thereby. The distance sensing unit 3 may employ radar technology, lidar technology, or other technologies adapted for sensing a distance to an object.

The EPB unit 4 receives a control signal, and is configured to decelerate the vehicle according to the control signal.

Figure 3:
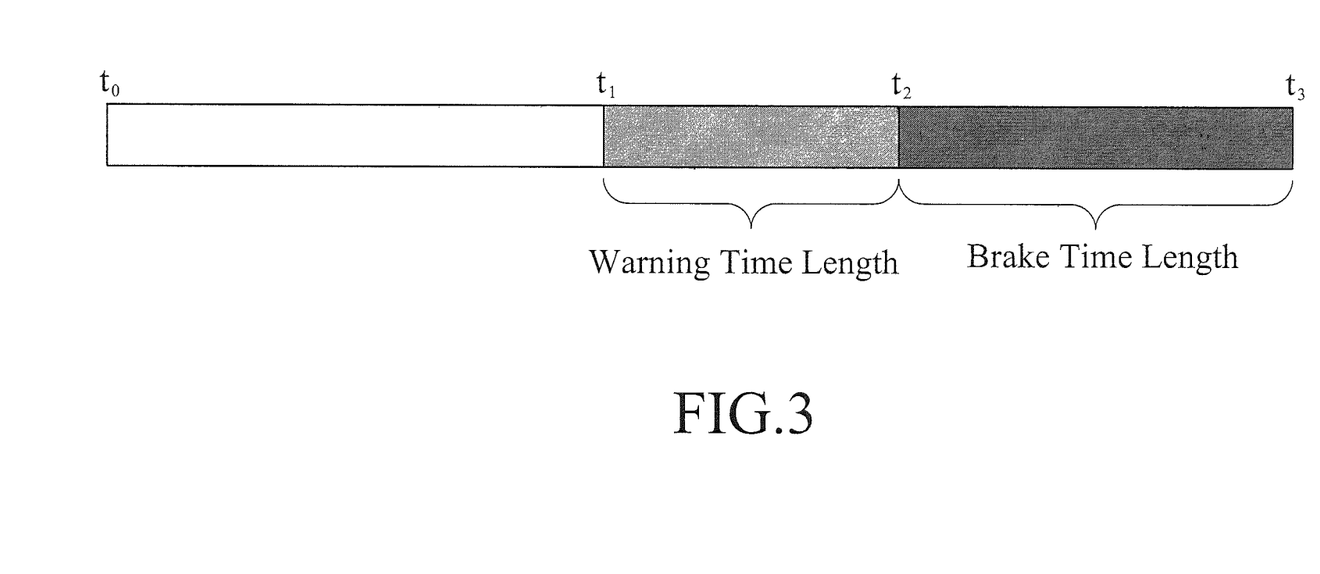
FIG. 3 is a schematic diagram illustrating a time period during which the preferred embodiment generates a warning and a time length required for braking.

Referring to FIGS. 1 to 3, the control unit 6 is coupled to the speed sensing unit 2 and the distance sensing unit 3 for respectively receiving the vehicle speed signal and the distance indicating signal therefrom, and is further coupled to the warning unit 5 and the EPB unit 6. The control unit 6 computes a length of collision time after which the vehicle is predicted to collide with the object according to the vehicle speed signal and the distance indicating signal, and outputs the control signal when the collision time is not longer than a brake time length, which is a time length required for braking.

In this embodiment, the control unit 6 controls the warning unit 5 to output a warning when the collision time ranges between the brake time length and a sum of the brake time length and a predetermined warning time length, thereby enabling the driver to act properly, and outputs the control signal for causing the vehicle to decelerate automatically via the EPB unit 5 when the collision time is not longer than the brake time length. In other embodiments, the control unit 6 may control the warning unit 5 to output the warning as long as the collision time is not longer than the sum of the brake time length and the predetermined warning time length, but the present invention is not limited in this respect.

The brake time length may be calculated according to the speed of the vehicle 9 acquired from the vehicle speed signal and deceleration of the vehicle 9. In one implementation, the control unit 6 calculates the brake time length to be: $v_c/a_m$, where $v_c$ is the speed of the vehicle 9 corresponding to the vehicle speed signal, and $a_m$ is the deceleration of the vehicle 9 acquired from the EPB unit 4.

In addition, a distance that the vehicle 9 moves during the brake time length may be calculated to be:

$$\left(\frac{v_c^2/a_m}{2}\right) + v_c \times \text{t\_delay}$$

where t_delay is a time delay of the brake operation.

Referring to FIGS. 1 and 2, in this embodiment, the control unit 6 calculates an elliptical predicted vehicle movement area according to:

$$\frac{(x_c - h_c)^2}{a_c^2} + \frac{(y_c - k_c)^2}{b_c^2} = 1$$

$$a_c = v_c t_p$$

$$b_c = W_c$$

where $x_c$ and $y_c$ represent a coordinate of an arbitrary point at a periphery of the predicted vehicle movement area, $h_c$ and $k_c$ represent a coordinate of a center of the predicted vehicle movement area, $a_c$ is equal to one half of a length of a major axis of the predicted vehicle movement area, $b_c$ is equal to one half of a length of a minor axis of the predicted vehicle movement area, $v_c$ is the speed of the vehicle corresponding to the vehicle speed signal, $t_p$ is a candidate time length, and $W_c$ is a width of the vehicle 9.

Referring to FIG. 2, the object 8 is exemplified as a person undergoing movement. The control unit 6 detects whether or not the object 8 is moving according to the distance indicating signal, and further calculates an elliptical predicted object movement area upon detecting that the object 8 is moving. In this embodiment, the predicted object movement area is calculated according to:

$$\frac{(x_b - h_b)^2}{a_b^2} + \frac{(y_b - k_b)^2}{b_b^2} = 1$$

$$a_b = v_b t_p$$

$$b_b = W_b$$

where $x_b$ and $y_b$ represent a coordinate of an arbitrary point at a periphery of the predicted object movement area, $h_b$ and $k_b$ represent a coordinate of a center of the predicted object movement area, $a_b$ is equal to one half of a length of a major axis of the predicted object movement area, $b_b$ is equal to one half of a length of a minor axis of the predicted object movement area, $v_b$ is a speed of the object acquired from the distance indicating signal, and $W_b$ represents a width of the object 8. The width of the object 8 may be a preset value, or may be obtained using distance sensing technology such as an ultrasonic sensor, laser, millimeter wave, or images.

In this embodiment, the control unit 6 further calculates a determination value in according to:

$$m = \frac{(x_b - x_c)}{a_c^2} + \frac{(y_b - y_c)}{b_c^2}$$

The control unit 6 determines that the candidate time length $t_p$ is the length of the collision time when the determination value m is smaller than 1, which represents that the peripheries of the predicted vehicle movement area and the predicted object movement area intersect, that is, represents a prediction of collision of the vehicle 9 with the object 8.

Figure 4:
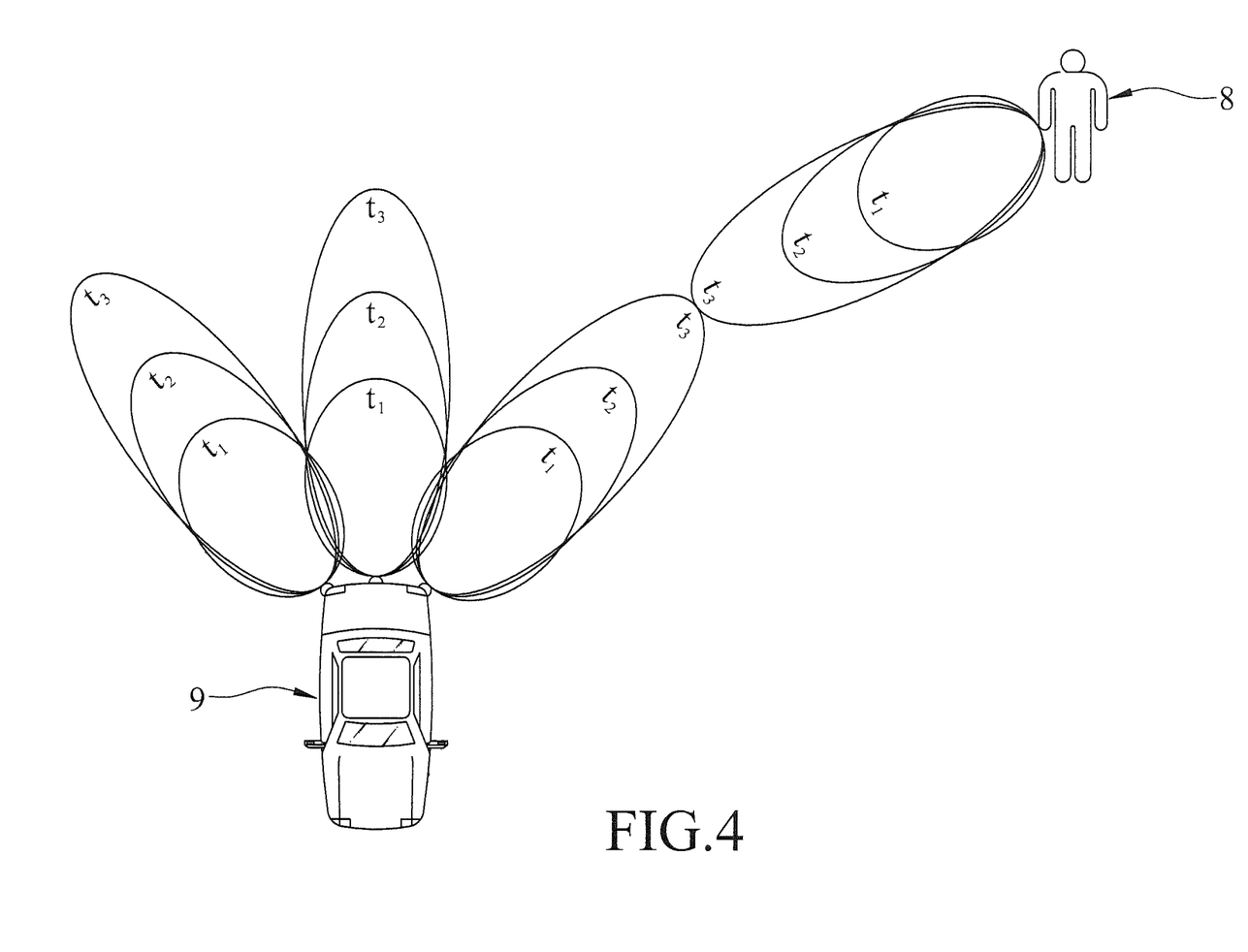
FIG. 4 is a schematic diagram illustrating that the predicted vehicle movement area varies with a movement path of a vehicle.

Referring to FIGS. 1 and 4, the predicted vehicle movement area calculated by the control unit 6 may vary with a movement path of the vehicle 9 when the vehicle 9 turns. FIG. 4 shows three possible movement paths corresponding to straight reverse, reverse to the right, and reverse to the left, respectively. Elliptical areas represent the object movement areas and the vehicle movement areas predicted by the control unit 6 using three candidate time lengths of t1, t2 and t3. In this embodiment, the movement path of the vehicle 9 is calculated according to:

$$x_r(t) = \frac{\Delta T}{2}(V_L(t) + V_R(t)) \times \cos\theta + x_{r0}$$

$$y_r(t) = \frac{\Delta T}{2}(V_L(t) + V_R(t)) \times \sin\theta + y_{r0}$$

where $x_r(t)$ and $y_r(t)$ represent a coordinate of the vehicle 9 that varies with time, $x_{r0}$ and $y_{r0}$ represent an initial coordinate of the vehicle 9, $V_L(t)$ and $V_R(t)$ represent respectively a speed of a left rear wheel of the vehicle 9 and a speed of a right rear wheel of the vehicle 9 that vary with time, $\Delta T$ is a sampling time length, and $\theta$ is a turning angle of the vehicle 9. The predicted vehicle movement areas are calculated using $x_r(t)$ and $y_r(t)$ to serve as $h_c$ and $k_c$, respectively.

Referring to FIGS. 1, 3 and 4, in this embodiment, the control unit 6 calculates a location of the object 8 that is located in a vicinity of the vehicle 9 according to the distance indicating signal generated by the distance sensing unit 3 when the vehicle 9 is being parked or is being driven in reverse gear. The control unit 6 calculates the object movement area upon determining that the object 8 is moving, and calculates the vehicle movement area according to a turning angle of the vehicle 9 and the vehicle speed signal outputted by the speed sensing unit 2, and determines whether or not the vehicle 9 will collide with the object 8, or the length of the collision time after which the vehicle 9 is predicted to collide with the object 8, and the time length required for braking (i.e., the brake time length) under the current vehicle speed. As shown in FIGS. 3 and 4, a current time point is denoted as $t_0$, and the control unit 6 predicts, according to the distance between the vehicle 9 and the object 8, the speed of the vehicle 9, and the speed of the object 8, that the vehicle 9 may collide with the object 8 at the time point $t_3$ if the vehicle 9 keeps on reversing to the left. In this case, the control unit 6 controls the warning unit 5 to output the warning from the time point $t_1$ for notifying the driver to pay attention. If the driver does not change the moving direction of the vehicle 9 or step on the brakes, so that the possibility of collision is not eliminated, the control unit 6 performs automatic brake operation (that is, to output the control signal so that the EPB unit 4 decelerates the vehicle 9) at the time point $t_2$. Through such a mechanism, driving safety may be ensured even if the driver is distracted or under an emergency situation.

Figure 5:
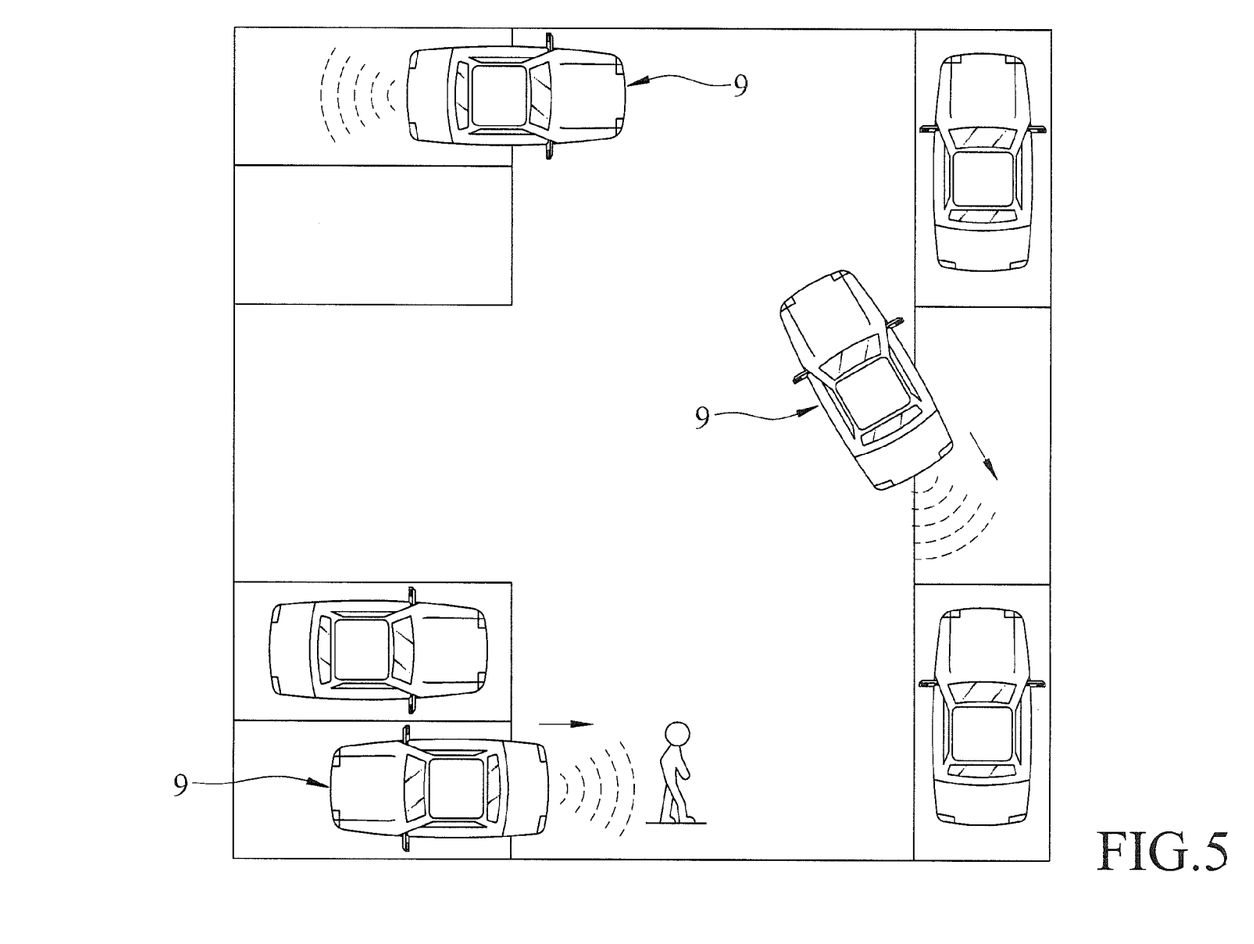
FIG. 5 is a schematic diagram illustrating a situation in which the preferred embodiment is applied.

FIG. 5 is a schematic diagram illustrating a situation suitable for application of the preferred embodiment. It is shown that the preferred embodiment is suitable to be applied for avoiding collision in parallel parking, reverse parking, or driving in reverse gear.

Some of the advantages of the preferred embodiment are as follows:

1. By virtue of the EPB unit 5 and cooperation with the speed sensing unit 2 and the distance sensing unit 3, the speed of the vehicle 9, the location of the object 8 in a vicinity of the vehicle 9, and the condition of the object 8 may be sensed, so as to warn the driver, to provide brake assist, or to perform brake operation when the vehicle 9 is driven in reverse gear or is being parked with a low speed even if the driver is distracted or under an emergency situation. Since application of the EPB unit 4 is becoming a popular device to vehicles, compared to the conventional techniques that employ the hydraulic brake control system or the electronic stability program, costs and control complexity of the system may be reduced by using the EPB unit 4 to provide brake assist.

2. The preferred embodiment may be integrated with an automatic parking system or a parking assist system to achieve a more complete function, or may cooperate with an autonomous emergency braking (AEB) system to further promote driving safety.

Figure 6:
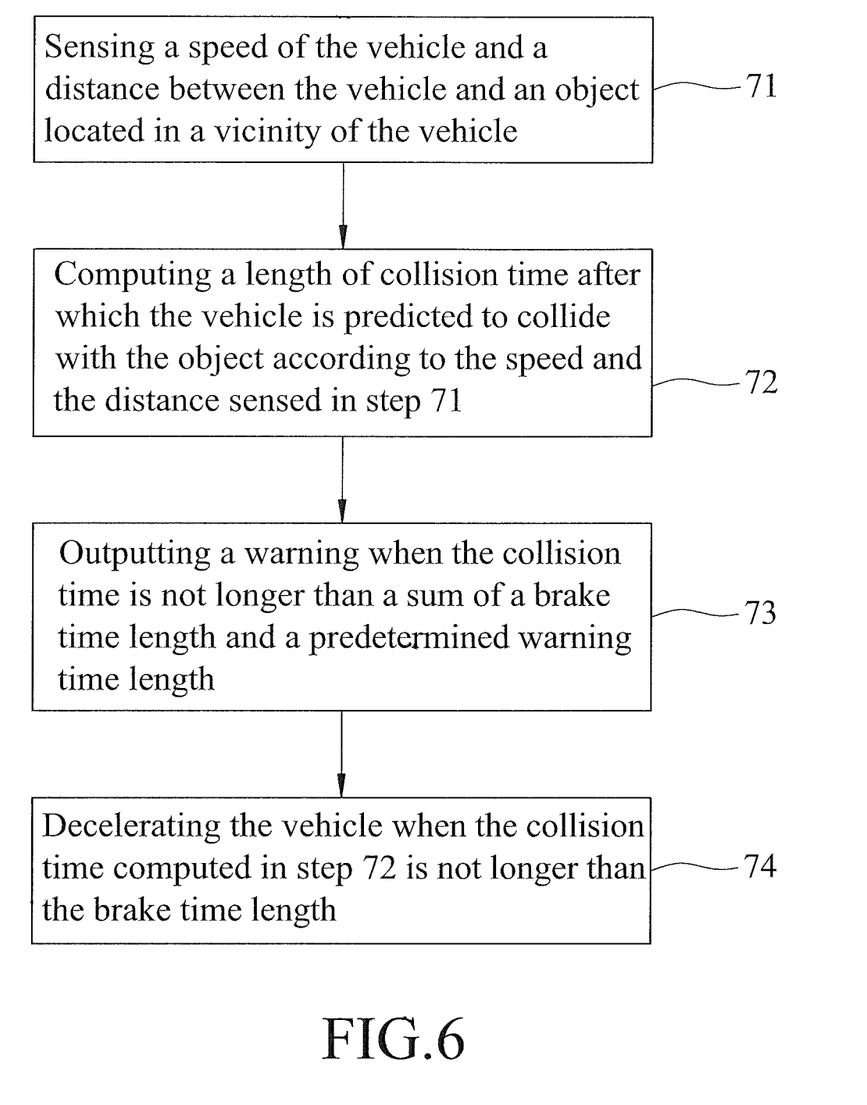
FIG. 6 is a flow chart of the preferred embodiment of a method for avoiding collision of a vehicle with an object according to the present invention.

Referring to FIGS. 1 and 6, a method for avoiding collision of a vehicle 9 with an object 8 according to the present invention is shown to be implemented by the preferred embodiment of the collision avoidance system, and includes the steps of:

Step 71: The collision avoidance system senses a speed of the vehicle 9 and a distance between the vehicle 9 and the object 8 located in a vicinity of the vehicle 9.

Step 72: The collision avoidance system computes a length of collision time after which the vehicle 9 is predicted to collide with the object 8 according to the speed and the distance sensed in step 71.

Step 73: The collision avoidance system outputs a warning when the collision time is not longer than a sum of a brake time length and a predetermined warning time length.

Step 74: The collision avoidance system decelerates the vehicle 9 when the collision time computed in step 72 is not longer than the brake time length.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A collision avoidance system configured to be installed in a vehicle, said collision avoidance system comprising:
   a speed sensing unit configured to sense a speed of the vehicle, and to generate a vehicle speed signal corresponding to the speed sensed thereby;
   a distance sensing unit configured to sense a distance between the vehicle and an object located in a vicinity of the vehicle, and to generate a distance indicating signal corresponding to the distance sensed thereby;
   an electronic parking brake (EPB) unit disposed to receive a control signal, and configured to decelerate the vehicle according to the control signal; and
   a control unit coupled to said speed sensing unit and said distance sensing unit for respectively receiving the vehicle speed signal and the distance indicating signal therefrom, and further coupled to said EPB unit, said control unit being configured to compute a length of collision time after which the vehicle is predicted to collide with the object according to the vehicle speed signal and the distance indicating signal, and to output the control signal when the collision time is not longer than a brake time length;
   further comprising a warning unit coupled to said control unit, wherein said control unit is further configured to control said warning unit to output a warning when the collision time is not longer than a sum of the brake time length and a predetermined warning time length.

2. The collision avoidance system as claimed in claim 1, wherein said control unit is further configured to calculate, for computing the length of the collision time, an elliptical predicted vehicle movement area according to:

$$\frac{(x_c - h_c)^2}{a_c^2} + \frac{(y_c - k_c)^2}{b_c^2} = 1$$

$$a_c = v_c t_p$$

$$b_c = W_c$$

where $x_c$ and $y_c$ represent a coordinate of an arbitrary point at a periphery of the predicted vehicle movement area, $h_c$ and $k_c$ represent a coordinate of a center of the predicted vehicle movement area, $a_c$ is equal to one half of a length of a major axis of the predicted vehicle movement area, $b_c$ is equal to one half of a length of a minor axis of the predicted vehicle movement area, $v_c$ is the speed of the vehicle corresponding to the vehicle speed signal, $t_p$ is a candidate time length, and $W_c$ is a width of the vehicle.

3. The collision avoidance system as claimed in claim 2, wherein said control unit is further configured to detect whether or not the object is moving according to the distance indicating signal, and to calculate, for computing the length of the collision time, an elliptical predicted object movement area upon detecting that the object is moving, the predicted object movement area being calculated according to:

$$\frac{(x_b - h_b)^2}{a_b^2} + \frac{(y_b - k_b)^2}{b_b^2} = 1$$

$$a_b = v_b t_p$$

$$b_b = W_b$$

where $x_b$ and $y_b$ represent a coordinate of an arbitrary point at a periphery of the predicted object movement area, $h_b$ and $k_b$ represent a coordinate of a center of the predicted object movement area, $a_b$ is equal to one half of a length of a major axis of the predicted object movement area, $b_b$ is equal to one half of a length of a minor axis of the predicted object movement area, $v_b$ is a speed of the object acquired from the distance indicating signal, and $W_b$ represents a width of the object.

4. The collision avoidance system as claimed in claim 3, wherein said control unit is configured to calculate, for computing the length of the collision time, a determination value m according to:

$$m = \frac{(x_b - x_c)}{a_c^2} + \frac{(y_b - y_c)}{b_c^2}$$

wherein said control unit determines that the candidate time length $t_p$ is the length of the collision time when the determination value m is smaller than 1, which represents a prediction of collision of the vehicle with the object.

5. The collision avoidance system as claimed in claim 4, wherein said control unit is further configured to calculate a movement path of the vehicle according to:

$$x_r(t) = \frac{\Delta T}{2}(V_L(t) + V_R(t)) \times \cos\theta + x_{r0}$$

$$y_r(t) = \frac{\Delta T}{2}(V_L(t) + V_R(t)) \times \sin\theta + y_{r0}$$

where $x_r(t)$ and $y_r(t)$ represent a coordinate of the vehicle that varies with time, $x_{r0}$ and $y_{r0}$ represent an initial coordinate of the vehicle, $V_L(t)$ and $V_R(t)$ represent respectively a speed of a left rear wheel of the vehicle and a speed of a right rear wheel of the vehicle that vary with time, $\Delta T$ is a sampling time length, and $\theta$ is a turning angle of the vehicle;

wherein said control unit is configured to calculate the predicted vehicle movement area by using $x_r(t)$ and $y_r(t)$ to serve as $h_c$, and $k_c$, respectively.

6. The collision avoidance system as claimed in claim 4, wherein said control unit is further configured to compute the brake time length to be $v_c/a_m$, where $a_m$ is the deceleration of the vehicle and is acquired from said EPB unit.

7. The collision avoidance system as claimed in claim 2, wherein said control unit is further configured to calculate a movement path of the vehicle according to:

$$x_r(t) = \frac{\Delta T}{2}(V_L(t) + V_R(t)) \times \cos\theta + x_{r0}$$

$$y_r(t) = \frac{\Delta T}{2}(V_L(t) + V_R(t)) \times \sin\theta + y_{r0}$$

where $x_r(t)$ and $y_r(t)$ represent a coordinate of the vehicle that varies with time, $x_{r0}$ and $y_{r0}$ represent an initial coordinate of the vehicle, $V_L(t)$ and $V_R(t)$ represent respectively a speed of a left rear wheel of the vehicle and a speed of a right rear wheel of the vehicle that vary with time, $\Delta T$ is a sampling time length, and $\theta$ is a turning angle of the vehicle;

wherein said control unit is configured to calculate the predicted vehicle movement area by using $x_r(t)$ and $y_r(t)$ to serve as $h_c$, and $k_c$, respectively.

8. The collision avoidance system as claimed in claim 1, wherein said control unit is further configured to compute the brake time length to be $v_c/a_m$, where $v_c$ is the speed of the vehicle corresponding to the vehicle speed signal, and $a_m$ is deceleration of the vehicle and is acquired from said EPB unit.

9. A method for avoiding collision of a vehicle with an object, said method to be implemented by a collision avoidance system installed in the vehicle, and comprising:

(A) sensing, by the collision avoidance system, a speed of the vehicle and a distance between the vehicle and an object located in a vicinity of the vehicle;

(B) computing, by the collision avoidance system, a length of collision time after which the vehicle is predicted to collide with the object according to the speed and the distance sensed in step (A);

(C) decelerating, by the collision avoidance system, the vehicle when the collision time computed in step (B) is not longer than a brake time length; and (D) outputting by the collision avoidance system, a warning when the collision time is not longer than a sum of the brake time length and a predetermined warning time length.

10. The method as claimed in claim 9, wherein step (B) includes:

(b1) calculating an elliptical predicted vehicle movement area according to:

$$\frac{(x_c - h_c)^2}{a_c^2} + \frac{(y_c - k_c)^2}{b_c^2} = 1$$

$$a_c = v_c t_p$$

$$b_c = W_c$$

where $x_c$ and $y_c$ represent a coordinate of an arbitrary point at a periphery of the predicted vehicle movement area, $h_c$ and $k_c$ represent a coordinate of a center of the predicted vehicle movement area, $a_c$ is equal to one half of a length of a major axis of the predicted vehicle movement area, $b_c$ is equal to one half of a length of a minor axis of the predicted vehicle movement area, $v_c$ is the speed of the vehicle sensed in step (A), $t_p$ is a candidate time length, and Wc is a width of the vehicle.

11. The method as claimed in claim 10, wherein step (B) further includes:

(b2) detecting whether or not the object is moving according to the distance sensed in step (A); and (b3) calculating an elliptical predicted object movement area when it is detected in sub-step (b2) that the object is moving, the predicted object movement area being calculated according to:

$$\frac{(x_b - h_b)^2}{a_b^2} + \frac{(y_b - k_b)^2}{b_b^2} = 1$$

$$a_b = v_b t_p$$

$$b_b = W_b$$

where $x_b$ and $y_b$ represent a coordinate of an arbitrary point at a periphery of the predicted object movement area, $h_b$ and $k_b$ represent a coordinate of a center of the predicted object movement area, $a_b$ is equal to one half of a length of a major axis of the predicted object movement area, $b_b$ is equal to one half of a length of a minor axis of the predicted object movement area, $v_b$ is a speed of the object acquired from the distance sensed in step (A), and $W_b$ represents a width of the object.

12. The method as claimed in claim 11, wherein step (B) further includes:

(b4) determining that the candidate time length $t_p$ is the length of the collision time length when the following relation is satisfied:

$$\frac{(x_b - h_c)^2}{a_c^2} + \frac{(y_b - k_c)^2}{b_c^2} < 1.$$

13. The method as claimed in claim 12, wherein sub-step (b1) further includes:

calculating a movement path of the vehicle according to:

$$x_r(t) = \frac{\Delta T}{2}(V_L(t) + V_R(t)) \times \cos\theta + x_{r0}$$

$$y_r(t) = \frac{\Delta T}{2}(V_L(t) + V_R(t)) \times \sin\theta + y_{r0}$$

where $x_r(t)$ and $y_r(t)$ represent a coordinate of the vehicle that varies with time, $x_{r0}$ and $y_{r0}$ represent an initial coordinate of the vehicle, $V_L(t)$ and $V_R(t)$ represent respectively a speed of a left rear wheel of the vehicle and a speed of a right rear wheel of the vehicle that vary with time, $\Delta T$ is a sampling time length, and $\theta$ is a turning angle of the vehicle;

wherein the predicted vehicle movement area is calculated by using $x_r(t)$ and $y_r(t)$ to serve as $h_c$, and $k_c$, respectively.

14. The method as claimed in claim 13, wherein step (C) includes calculating the brake time length to be $v_m/a_m$, where $a_m$ is deceleration of the vehicle.

15. The method as claimed in claim 10, wherein sub-step (b1) includes:

calculating a movement path of the vehicle according to:

$$x_r(t) = \frac{\Delta T}{2}(V_L(t) + V_R(t)) \times \cos\theta + x_{r0}$$

$$y_r(t) = \frac{\Delta T}{2}(V_L(t) + V_R(t)) \times \sin\theta + y_{r0}$$

where $x_r(t)$ and $y_r(t)$ represent a coordinate of the vehicle that varies with time, $x_{r0}$ and $y_{r0}$ represent an initial coordinate of the vehicle, $V_L(t)$ and $V_R(t)$ represent respectively a speed of a left rear wheel of the vehicle and a speed of a right rear wheel of the vehicle that vary with time, $\Delta T$ is a sampling time length, and $\theta$ is a turning angle of the vehicle;

wherein the predicted vehicle movement area is calculated by using $x_r(t)$ and $y_r(t)$ to serve as $h_c$, and $k_c$, respectively.

16. The method as claimed in claim 9, wherein step (C) includes calculating the brake time length to be $v_c/a_m$, where $v_c$ is the speed of the vehicle sensed in step (A), and $a_m$ is deceleration of the vehicle.

17. The method as claimed in claim 9, wherein step (B) includes predicting a vehicle movement area and an object movement area according to the speed and the distance sensed in step (A), the length of the collision time being computed according to the vehicle movement area and the object movement area thus predicted.

18. The method as claimed in claim 17, wherein, in step (B), each of the vehicle movement area and the object movement area is an elliptical area.

* * * * *